(No Model.)
F. O. McCLEARY.
GRIDDLE.
No. 559,037. Patented Apr. 28, 1896.
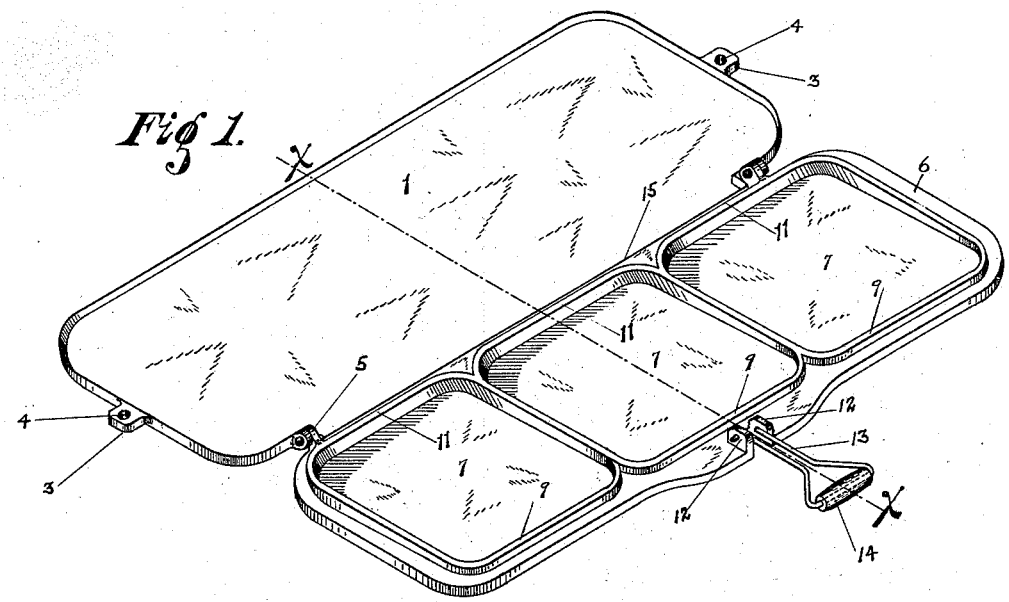
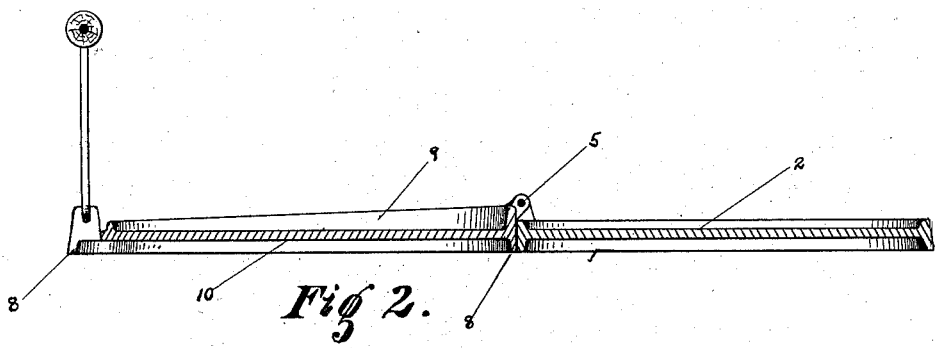
WITNESSES:
INVENTOR

UNITED STATES PATENT OFFICE.

FRANK O. McCLEARY, OF CANTON, OHIO, ASSIGNOR TO BARBARA SHAEFFER, OF SAME PLACE.

GRIDDLE.

SPECIFICATION forming part of Letters Patent No. 559,037, dated April 28, 1896.

Application filed March 19, 1895. Serial No. 542,423. (No model.)

*To all whom it may concern:*

Be it known that I, FRANK O. McCLEARY, a citizen of the United States, residing at Canton, in the county of Stark and State of Ohio, have invented certain new and useful Improvements in Griddles; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to that class of cake-griddles in which a hinged section provided with pans or cake-cups is employed in combination with a stationary section upon which the hinged section is adapted to be turned.

The primary object of the invention is to provide a griddle so constructed as to insure an even distribution of the heat to all parts of the cake pans or cups, and thus to effect a uniformity in the baking.

Further objects are to provide convenient means for preventing the dripping of grease and the slipping of the cakes out of the cups when the latter are turned to dump the cakes, and to improve the details of construction, as will be fully described hereinafter, and defined in the appended claim.

In the accompanying drawings, Figure 1 is a view in perspective of my improved griddle in open position. Fig. 2 is a transverse section on the line X X of Fig. 1.

The reference-numeral 1 indicates the main or stationary section of the griddle, provided with the usual flat surface 2, and having at each of its ends a short horizontally-projecting lug 3, formed with an opening 4, the office of which will be hereinafter explained.

Secured to the section 1 by any suitable hinges 5 is the movable section 6, provided with cake pans or cups 7.

I have found that by the construction illustrated in the drawings a uniform browning and baking of the cakes are effected. I provide the under side of the section 6 with a depending edge flange 8, adapted to rest upon the stove. The pans 7 are formed by casting rims 9 of varying height upon the upper surface of the section 6. The pans thus rise from the surface of the section 6, instead of extending below said surface. The under side 10 of the section 6 is flat and smooth, and forms with its edge flange 8 a heating-space below the several pans, within which the heat is equally distributed.

The rims 9 of the pans may of course be arranged in circular or other form, as heretofore, but I preferably make the pans of the form shown to bake cakes of substantially square shape with rounded corners.

The graduation in the height of the pan-rims 9 is to provide means for preventing the dripping of grease or the slipping of the cakes out of the pans or cups when the section 6 is turned upside down upon the section 1. The upwardly-extended sides 11 of the rims serve to catch the grease and prevent its dripping out of the cups. While the rims 9 are best adapted for pans rising above the surface, they are also applicable to sunken pans.

While any suitable handle may be employed in connection with my improved griddle, I preferably provide the section 6 with perforated ears 12, adapted to receive the arms 13 of a spring-handle 14. The lugs or ears 12 are of sufficient height to enable the handle to be turned over the rim 9 and into the central pan for shipment. These lugs 12 also serve as contact-lugs to support the section 6 above the section 1 when turned thereon.

As these griddles are usually shipped in lots or stacks of six or more, I provide the end lugs 3 on the section 1. When the griddles are arranged in a stack or pile one upon another, these perforated lugs register with one another and a binding-wire is inserted through them, and the lugs thus constitute a convenient and secure means for securing the package for transportation.

The section 1 at its hinged side extends outwardly to form a grease-guard 15, as shown.

Having fully described my invention, what I claim as new, and desire to secure by Letters Patent, is—

A cake-griddle comprising sections 1 and 6 hinged together, the section, 6, having a smooth, flat under surface throughout its area, and provided on its upper surface with a series of vertical flanges, 9, which serve as cake-pans to confine the batter to shape the cakes, and to confine the grease while the cakes are baking, said flanges being graduated in height from one side to the other to form grease-guards, 11, thus avoiding the use of a grease-guard separate from the rim of the cake-pan, substantially as described.

In testimony whereof I affix my signature in presence of two witnesses.

FRANK O. McCLEARY.

Witnesses:
JOHN C. BOTHWELL,
T. W. LEAHY.